March 21, 1950 A. E. FRIDOLPH Re. 23,209

HANGER SYSTEM AND ELEMENTS FOR FLEXIBLE HANGINGS

Original Filed June 25, 1942 7 Sheets-Sheet 1

INVENTOR.
Annette E. Fridolph

BY Barnes, Kisselle, Laughlin & Raisch
Attorneys

March 21, 1950 A. E. FRIDOLPH Re. 23,209
HANGER SYSTEM AND ELEMENTS FOR FLEXIBLE HANGINGS
Original Filed June 25, 1942 7 Sheets-Sheet 2
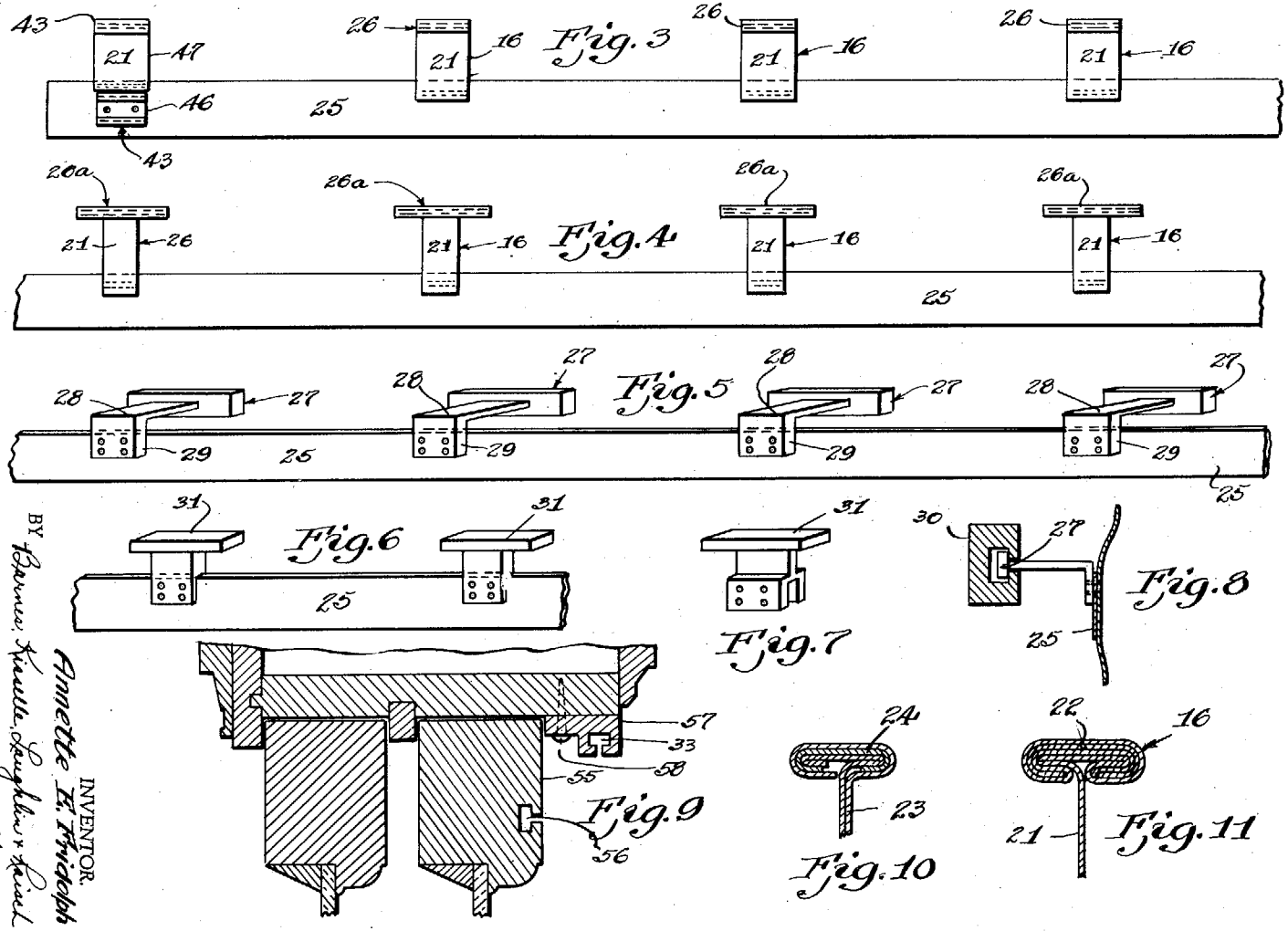
INVENTOR.
Annette E. Fridolph
BY Barnes, Kisselle, Laughlin & Raisch
Attorneys.

March 21, 1950 — A. E. FRIDOLPH — Re. 23,209
HANGER SYSTEM AND ELEMENTS FOR FLEXIBLE HANGINGS
Original Filed June 25, 1942 — 7 Sheets-Sheet 3
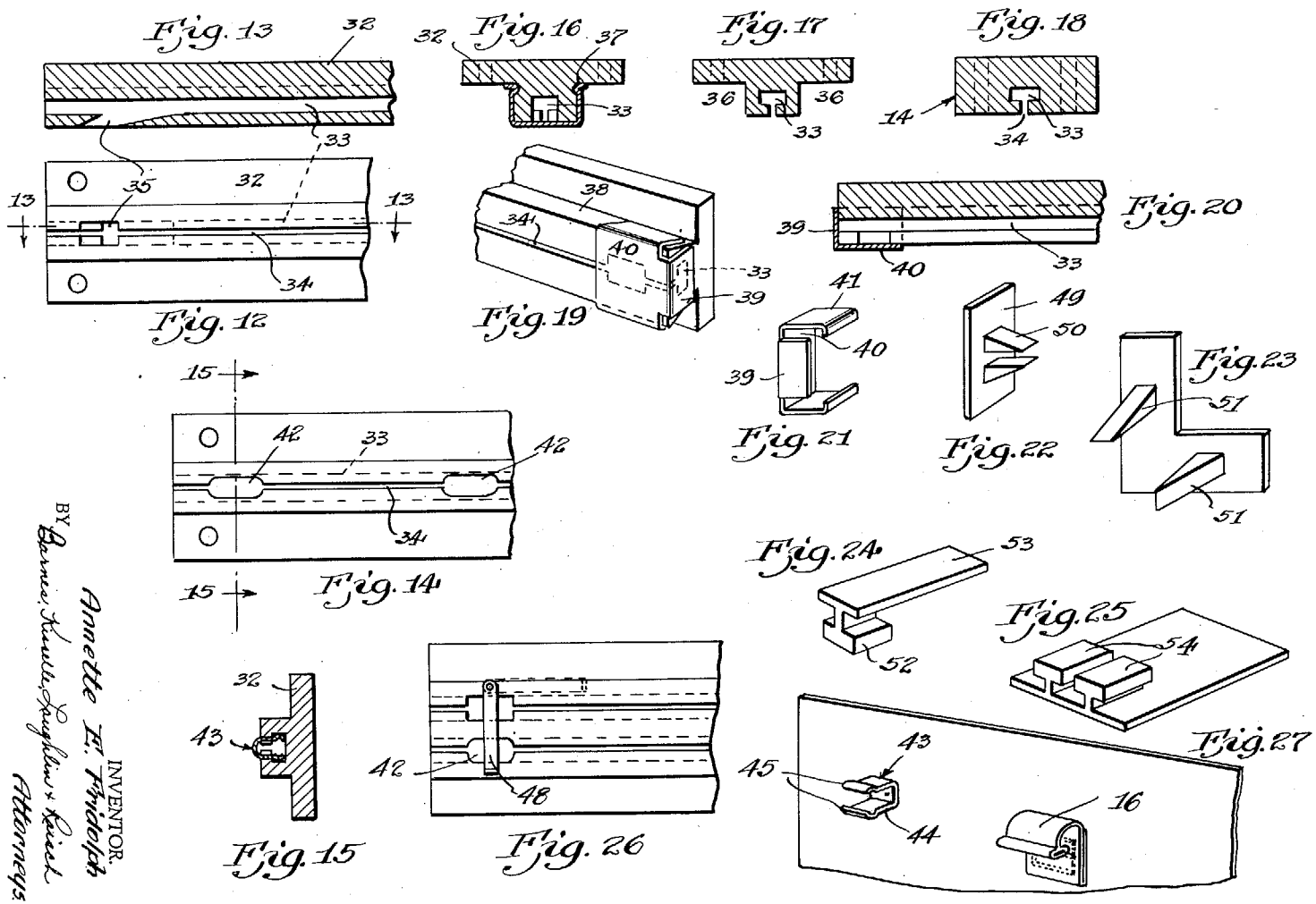
INVENTOR.
Annette E. Fridolph
BY Barnes, Kisselle, Raugh, Lin & Reisch
Attorneys.

March 21, 1950
A. E. FRIDOLPH
HANGER SYSTEM AND ELEMENTS
FOR FLEXIBLE HANGINGS
Re. 23,209
Original Filed June 25, 1942
7 Sheets-Sheet 4
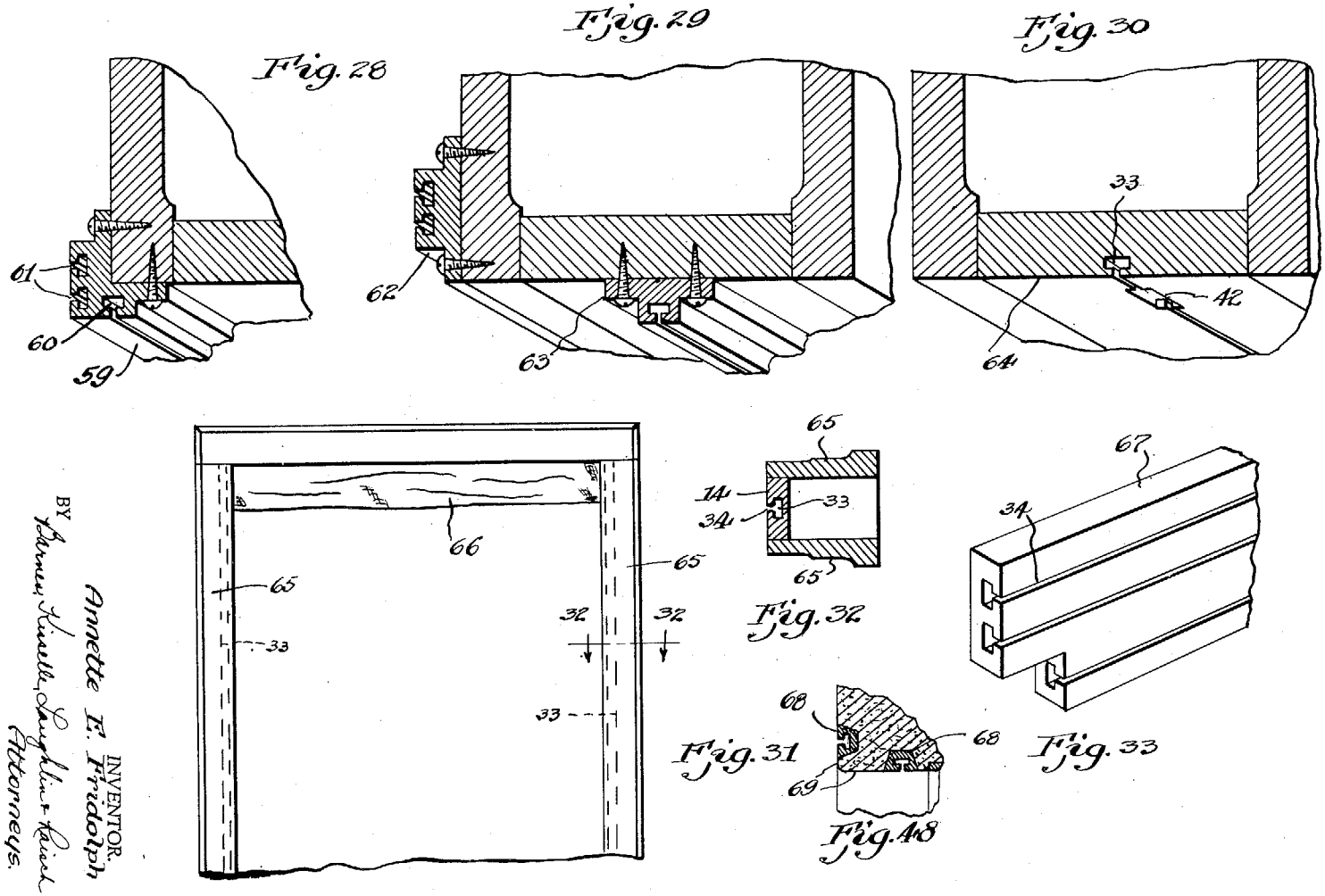
INVENTOR.
Annette E. Fridolph
BY Barnes, Kisselle, Laughlin & Raisch
Attorneys.

March 21, 1950 A. E. FRIDOLPH Re. 23,209

HANGER SYSTEM AND ELEMENTS FOR FLEXIBLE HANGINGS

Original Filed June 25, 1942 7 Sheets-Sheet 5

INVENTOR.
Annette E. Fridolph
BY Barnes, Kisselle, Laughlin & Raisch
Attorneys.

INVENTOR.
Annette E. Fridolph
BY Barnes, Kisselle, Laughlin & Raisch
Attorneys.

INVENTOR.
Annette E. Fridolph
BY
Barnes, Kisselle, Raisch & Choate
Attorneys.

Reissued Mar. 21, 1950

Re. 23,209

UNITED STATES PATENT OFFICE 23,209

HANGER SYSTEM AND ELEMENTS FOR FLEXIBLE HANGINGS

Annette E. Fridolph, New York, N. Y.

Original No. 2,412,608, dated December 17, 1946, Serial No. 448,405, June 25, 1942. Application for reissue March 13, 1947, Serial No. 734,409

7 Claims. (Cl. 16—87.4)

Matter enclosed in heavy brackets [ ] appears in the original patent but forms no part of this reissue specification; matter printed in italics indicates the additions made by reissue

This invention *relates to a hanger system and to elements of the system, for supporting hangings of cloth or other flexible fabric. Among other things, it* has to do with a combined header and supporting member, and [has to do] particularly with a unitary member which serves as a header jamb for windows or doors, and also as a traverse member for slidably supporting curtains and the like.

Before the advent of the modern metallic curtain and drapery rods, which are usually fastened in some way to the top frame of a window or door opening, it was common practice to form the traverse curtain or drapery rod of wood, usually of two or more parts, so fabricated as to form a slot in the assembled parts, and this rod was attached in some way to the window or door frame. Not only were these prior art wooden traverse members bulky in cross section and design, but the nature of the rollers and the like for supporting the curtain was such as to require a relatively large traverse member. Furthermore, like the modern metal curtain rods, the supporting hangers or rollers for the curtains and the like had to be removed from the curtains, drapes, and so forth to permit cleaning and washing of the latter. It also has been practice, both in the old type wooden curtain rods and modern metallic curtain rods to provide peculiar shapes and arrangements of the sliding or carrying members in the way of anti-friction devices or friction devices to control the sliding movement of the supporting members in the curtain rod.

It is an object of the present invention to provide a traverse or supporting member [along the lines roughly suggested by the prior art such as the patent to Moore No. 1,152,383, and to so improve the same] *so improved* that the traverse member is not only small and compact [, such as the modern metallic curtain hanger,] but [to so arrange the same] *is arranged so* that [the traverse member] *it forms,* in itself, [forms] the header, jamb, *face, trim or molding* of the window or door opening; or, vice versa, the standard header, jamb, *face, trim or molding* of a window or door is so designed and arranged as to *form,* in itself, [form] the traverse carrying member for curtains, drapes or the like. Any auxiliary curtain or drapery rod or hanger is completely eliminated because the standard small, neat appearing, header, jamb, *face, trim or molding* of a door or window is in itself transformed into a curtain and/or drapery hanger.

A further feature of the invention, and one which makes possible the use of standard header members for window openings and the like, is that a fairly small T slot *or track* is formed in the integral header member and a small opening is formed in [the end of] the header member [and] in [the vertical] part of the T slot *or track* so as to permit *easy* assembly *or disassembly* of the supporting member for the curtain and the like in said T slot *or track.* Additional features have to do with the design, shape and arrangement of these assembly slots.

A further and important feature of the present invention has to do with the supporting members which slide in the T slot formed in the header member. These supporting members are preferably formed of cloth or tape which may be sewed or otherwise permanently attached to the curtain, drape and the like, and the top of which carrying members is preferably enlarged or wrapped around reinforcing means so as to form a small cloth surfaced head of such a small size as to fit in the T slot. It has been found that such a cloth surfaced head member gives just the right sliding action of the heads in the T slot; in other words, the transverse movement of the curtain, drape or the like is smooth and free but, at the same time, is not too jerky as is often the case when roller bearings and similar carrying units are used; furthermore, this smooth, sliding movement is noiseless. A further feature resulting directly from using this type of carrying members is the fact they may be [sold] *made* in strips to be sewed on the curtains or drapes, and because these carrying members are made of cloth or similar fabric, they may be readily removed from the combined header and traverse member and washed with the curtain.

Other features have to do with details of design of the combined header member and supporting member and the connecting means for slidably supporting curtains and the like therein, as will be more fully set forth in the specification and claims.

*This invention may be said, in general, to provide a hanger system and elements of the system for supporting flexible hangings of cloth or other fabric, such as curtains, coverings, panels, valances and the like, so that the hangings by simple manipulation can be quickly assembled or suspended in place, adjusted as desired, removed for cleaning or laundering, and replaced—all through the mere relative movement or separation of slidably cooperating elements of the system and without requiring any fastening or unfastening of parts or the use of bulky, complex or metallic elements of any kind.*

*As appears in detail from the following description and the accompanying drawings of preferred embodiments, the system comprises a traverse member in the form of a long slotted track of small transverse dimensions made integral with, or in a strip fixed to or embedded in, the face, edge, trim or molding of a wall, wall opening, shelf, frame or the like, and adapted to receive and hold one or more cooperating gangs of individual small slider elements of peculiar construction in freely slidable relation to the track. The sliders respectively have small slender heads which are relatively rigid and are adapted to be received loosely in line within a longitudinal base of the track, which holds them so that they may slide along and tilt with respect to the track, together with thin body portions which are secured to the heads and extend from them so as to pass through and slide freely along a narrow slot that opens from the face of the track member into its base section. A gang of these sliders may be sewn or otherwise permanently attached in spaced relation to a transverse tape to form a slider tape unit which in turn may be similarly attached to and along a margin or margins of the hanging, or the sliders may be attached directly to the hanging at intervals along its margin or margins. Either arrangement provides many small individual slider supports for the hanging permanently spaced along one or more of its margins and so functioning in cooperation with a suitable track member that the flexible hanging is supported and can be dealt with in the manner required.*

*The desired simple removal and replacement of a hanging thus adapted to the system is achieved through one or more apertures or passages which are provided preferably in the face of the supporting track as enlargements of its narrow slot opening into its base. These preferably are so related to the length and width of the slender slider heads that the heads can be moved freely across the apertures by pulling their attached body portions or an attached hanging along the track, and yet so that the heads may be tilted and passed through any of the apertures from or into the base section by an outward or angular pull on their body portions or the attached hanging.*

In the drawings:

Fig. 3 is a fragmentary view of a portion of a length of curtain or drapery tape and slider assembly including the tape portion for connecting to the curtain or drapery and the like, and the slider [portion] *portions* for insertion in the combined curtain rod and molding.

Fig. 4 is a view similar to Fig. 3 but illustrating the use of a different type of slider [unit] *units*.

Fig. 5 is a view similar to Figs. 3 and 4 but illustrating the use of plastic slider units adapted to hold the curtain or like assembly a definite distance from the curtain [rod] *traverse*.

Fig. 6 illustrates an assembly similar to Fig. 5, but showing the slider members shaped in position for vertical attachment.

Fig. 7 is a detail view of the slider member as used in the assembly shown in Fig. 6.

Fig. 8 is a sectional view illustrating a method of supporting the assembly unit shown in Fig. 5 in a combined curtain traverse and molding, and also showing the preferred manner of attaching the same to a curtain or the like.

Fig. 9 is a sectional view of a conventional window frame assembly and one manner of using my combined molding and curtain traverse to complete the window frame.

Fig. 10 is a sectional view of a slider member formed mainly of cloth with a reinforcing of metal.

Fig. 11 is a view similar to Fig. 10 but illustrating a single tape or body portion instead of a double portion as in Fig. 10.

Fig. 12 is an elevation of a combined curtain traverse and door molding or head, showing a single slot and aperture for receiving slider members.

Fig. 13 is a sectional view taken on line 13—13 of Fig. 12.

Fig. 14 is a view similar to Fig. 13 but showing the aperture for receiving the heads of the slider members *in preferred form* as a straight opening instead of an angular opening as in Fig. 13.

Fig. 15 is a sectional view taken on line 15—15 of Fig. 14 and illustrating the use of a clip member for closing the aperture.

Fig. 16 is a cross sectional view taken through the aperture opening in Fig. 12, but illustrating a modified shape in cross section adapted to receive a clip member for use in cases where the header member is not closed at the end by other portions of the window framework and the like.

Figs. 17 and 18 are sectional views taken through the main portion of a combined molding and traverse member illustrating modifications in cross sectional shape.

Fig. 19 is a fragmentary perspective view of a combined traverse and molding member of still slightly different cross sectional shape and illustrating a clip member for closing the aperture as well as the end of the slot.

Fig. 20 is a longitudinal sectional view through the unit shown in Fig. 19.

Figs. 21 to 25 illustrate different types of insertable stop members for closing the apertures at the end of the slots.

Fig. 26 illustrates the use of a pivoted stop member for closing apertures in a molding section having two slotted portions.

Fig. 27 is a fragmentary perspective view of a drape showing one of a plurality of slider members sewed thereto and a clip member of the type illustrated in Fig. 15 for inserting in an aperture.

Fig. 28 illustrates the incorporation of the invention in an ornamental member permanently secured to the corner of a door or window opening and containing three slotted portions.

Fig. 29 is a view similar to Fig. 28 showing the combined moldings and traverse members secured to the side and bottom of the header and having a double and single slot respectively.

Fig. 30 illustrates a header member similar to Figs. 28 and 29 but showing the traverse as being formed directly in the header member itself.

Fig. 31 illustrates a modified form of my invention in which the side members of a standard window frame or the like are slotted to receive slide members secured to a blackout curtain and the like.

Fig. 32 is a sectional view taken on line 32—32 of Fig. 31.

Fig. 33 illustrates a molding or frame unit provided with a triple slot.

Figure 36:
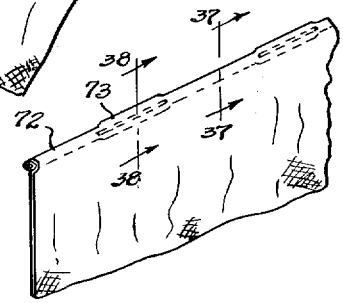
Fig. 36 is a fragmentary perspective view illustrating one method of rolling over the top edge of the curtain with spaced reinforcing members formed as a part of the rolled over portion.
Figure 37:
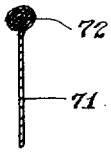
Figure 38:
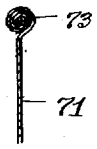

Figs. 37 and 38 are sectional views taken on lines 37—37 and 38—38, respectively, of Fig. 36.

Figure 40:
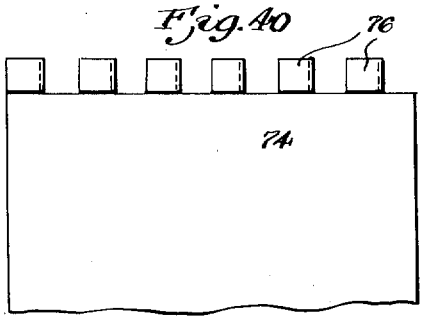
Figure 39:
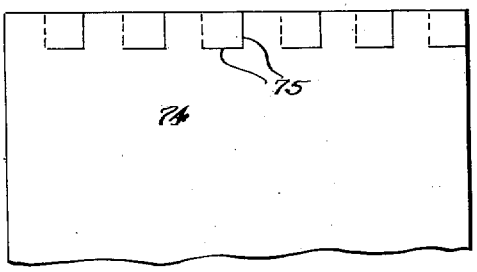

Figs. 39 and 40 illustrate one manner of cutting spaced portions in the top of the curtain preparatory to rolling the portions into the header members.

Figure 41:
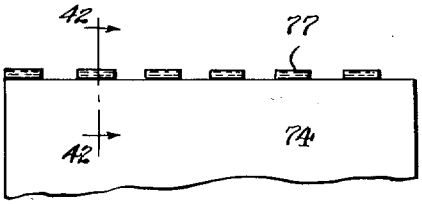

Fig. 41 illustrates the folded over portion of the curtain rolled up into header members.

Figure 42:
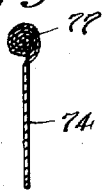

Fig. 42 is a sectional view taken on line 42—42 of Fig. 41.

Figure 43:
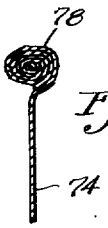
Figure 35:
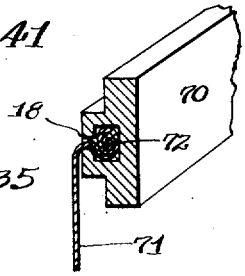
Fig. 35 is a sectional view taken on line 35—35 of Fig. 34 and illustrating the rolling over of the top edge of the curtain so as to form the header member sliding in the slot of the traverse.

Fig. 43 is a view similar to Fig. 42 but illustrating a reinforcing member in the center of the rolled up portion.

Figure 44:
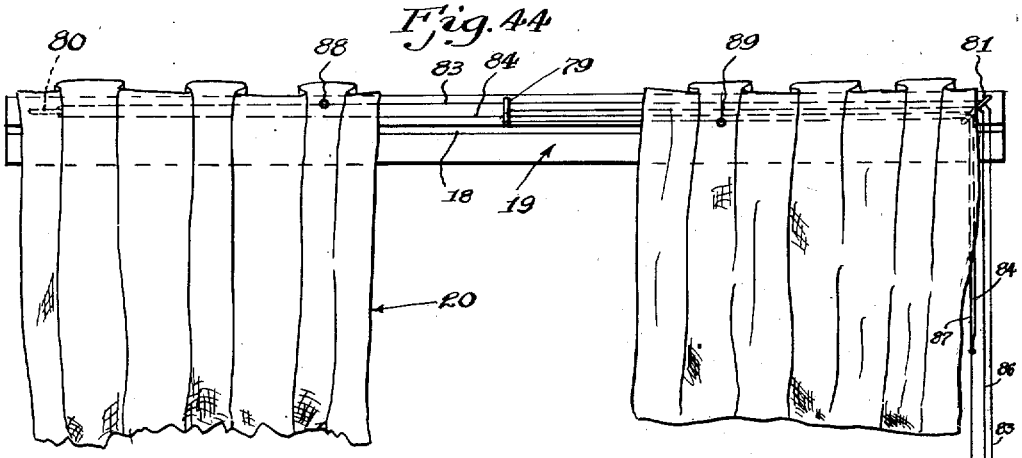
Figure 45:
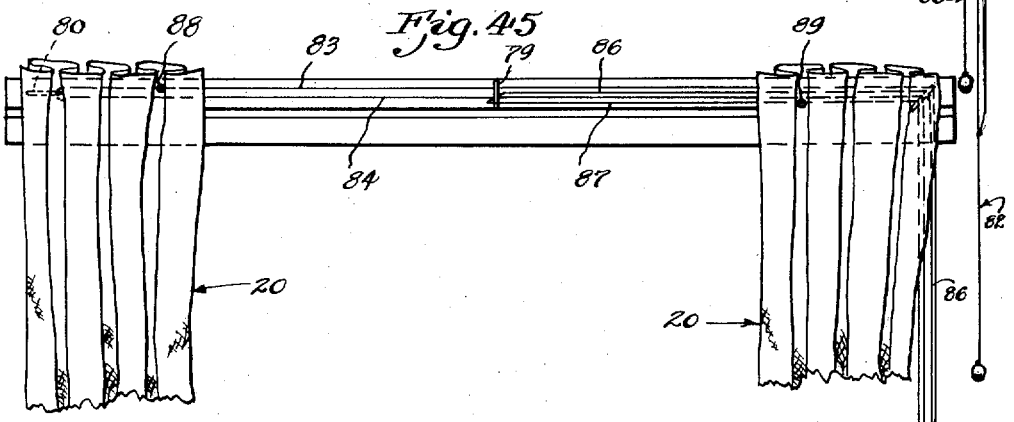
Figure 46:
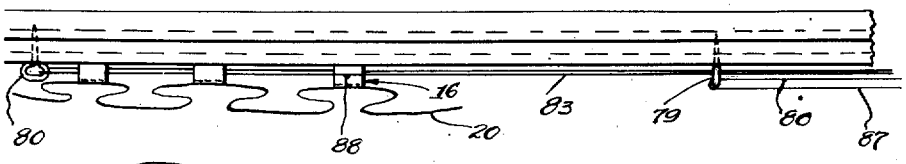

Figs. 44 to 46 illustrate a typical installation in accordance with the present invention and showing the use of pull cords for controlling the movement of the slider members.

Figure 47:
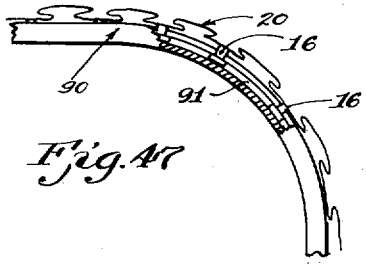

Fig. 47 is a plan view partially in section illustrating the adaptation of my invention to any header member such as might be found in the top molding of a show case and the like, slotted to receive slider members.

Fig. 48 is a fragmentary detail view illustrating one form of wood traverse recessed into the plaster wall so that the surface of the traverse is flush with the surface of the wall.

Figure 49:
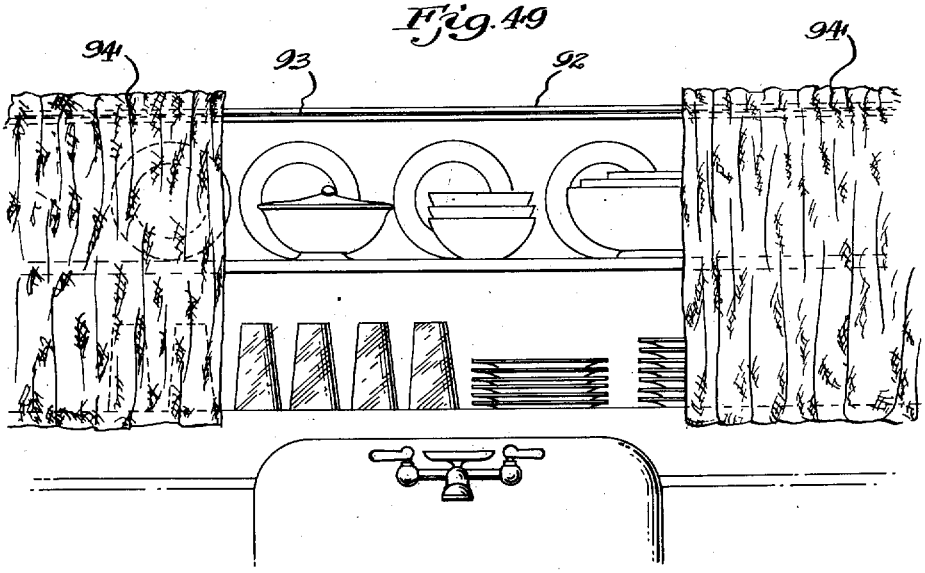

Fig. 49 is a view illustrating one manner of slotting the upper shelf of a kitchen cabinet whereby the shelf forms a traverse for the hanging of a curtain.

Figure 50:
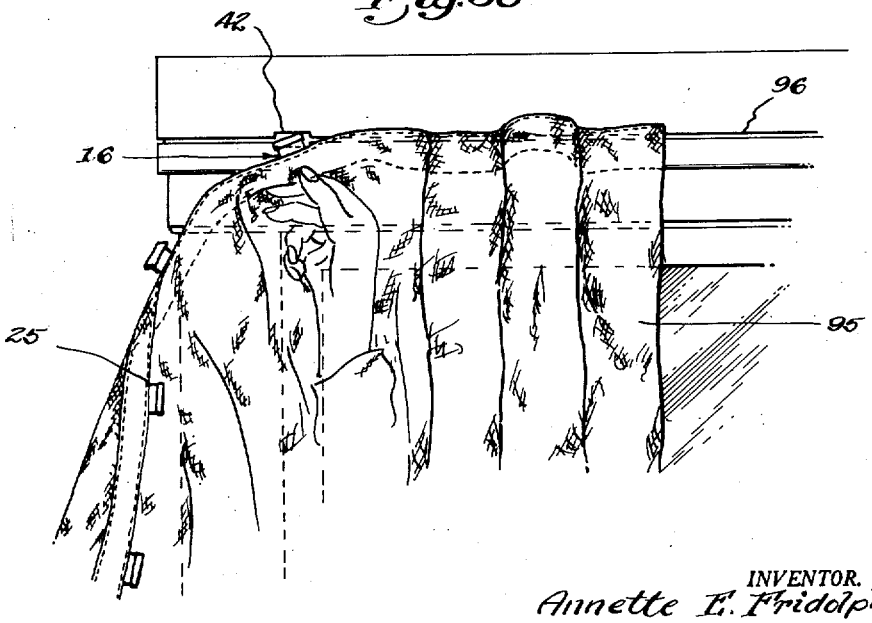

Fig. 50 is a view illustrating the method of assembly or removal of a typical drape provided with my slider members.

Figure 2:
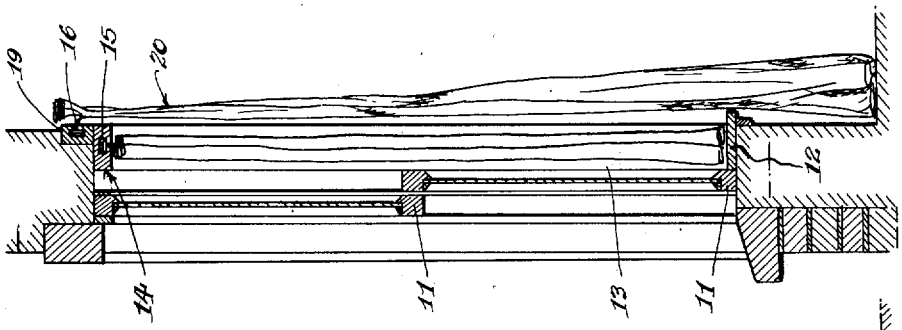
Fig. 2 is a sectional view taken on line 2—2 of Fig. 1 and illustrating the manner of slotting the header members of the window frame to provide both a drapery traverse and a curtain traverse as one embodiment of the present invention.
Figure 1:
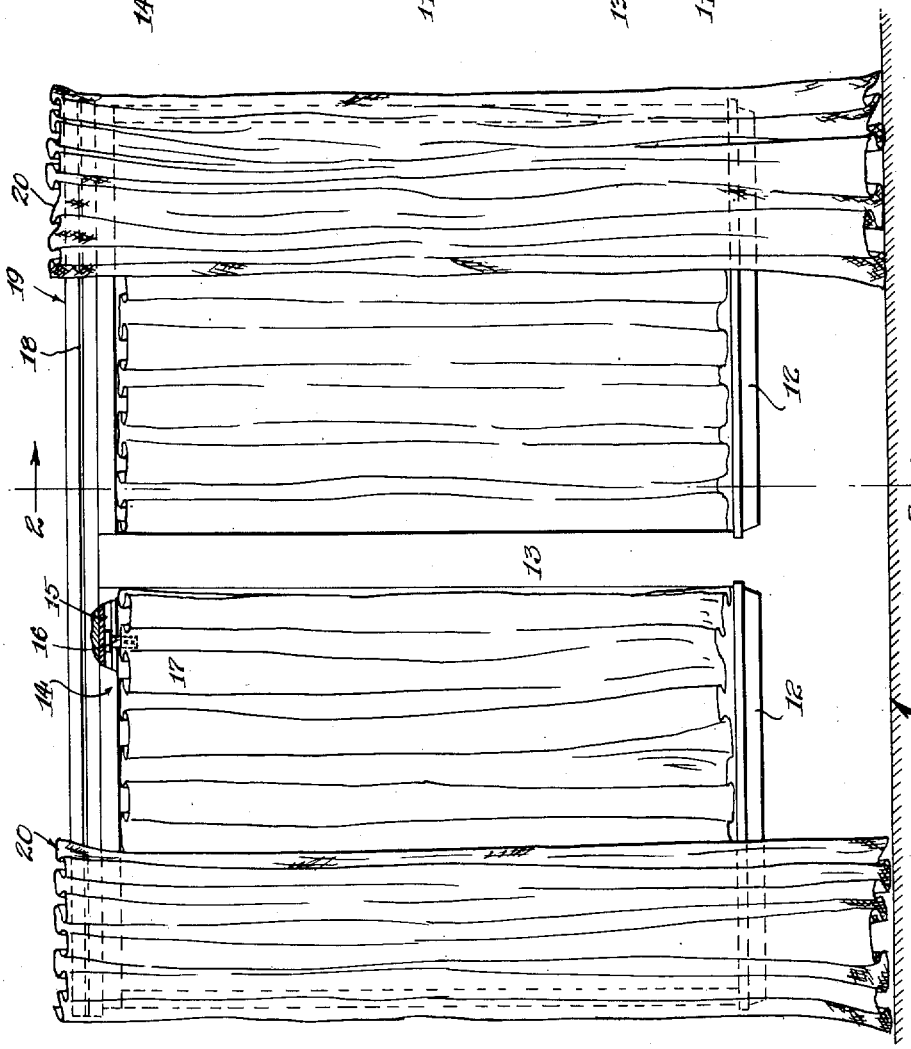
Fig. 1 is an elevation of [what appears to be] a conventional window frame provided with window curtains and drapes, the means for supporting the curtains and drapes not being visible.

A typical embodiment of the present invention is illustrated in Figs. 1 and 2 where the same is shown as part of a window frame. Standard window sashes are illustrated as at 11 and the window frame for carrying the sashes is shown as having a standard bottom member 12, a side member 13 and a header member 14. Instead of using a standard solid header member I have provided a relatively small T-slot 15 which extends across the length of the header member 14.

The curtain or other hanging member is supported directly by this small T-slot in the header member and, as shown in Fig. 1, this is accomplished by sewing slider members 16 directly to the top of the curtain 17, these slider members having enlarged head portions adapted to fit in and slide along the T-slot 15. This T-slot in many of the figures is shown relatively large, for purposes of illustration, and it will be understood that the T-slot is relatively small in cross sectional dimensions. *The individual slider heads, as seen at 26, 26a and 27 in Figs. 3 to 5 and elsewhere in the drawings, are small slender or rod-shaped members of rigid construction which may be retained by and moved freely along the base of the slot or track of the traverse member; yet they, too, appear relatively large in many of the figures.* It will thus be seen, in Figs. 1 and 2, that I have provided a wooden traverse member which forms an integral part of and completes the window frame. This construction not only eliminates curtain rods and fixtures, etc., but it renders unnecessary additional fixtures of any type because the curtain traverse is formed directly within the window header itself, *and because the cooperating sliders are attached permanently as an integral part of the curtain or other hanging itself.*

If it is desired to hang drapes, in addition to the glass curtains, I may provide a second slot in the window header 14 or, as best shown in Figs. 1 and 2, I can provide a T-slot 18 in the window header trim 19. Slider members 16 may be sewed directly to the drapes 20 and such slider members fitting in the T-slot 18 will carry and slide the drapes along the window trim member 19 used as a traverse member.

The preferred form of slider member construction is best shown in Fig. 11, where the slider member 16 is shown as being formed of a length of cloth tape 21 which terminates in an enlarged header portion which is formed by means of a channeled member 22 which may be made of metal or other suitable material, and in which and around which is clamped and folded the end portion of the tape 21. In this manner the slider head is completely covered by fabric and the formed channel shaped metal portion 22 is permanently and securely fastened to the tape. In the modified form shown in Fig. 10, the structure is quite similar to that shown in Fig. 11, the most important difference being that the tape portion 23 is formed of a tube of fabric, into one end of which is inserted a piece of metal or other material 24 and then bent to the form shown so that the fabric is then folded within and covers the bent member 24. It will be understood that the header portions of the slider members may be reinforced in many different ways, such as by means of plastic or even short pieces of wood and the like, but in the preferred form such reinforcings are covered with cloth, as will be later explained.

The slider members 16 may be directly sewed to the top of the curtain, drape or the like, such as best shown in Fig. 27, at regularly spaced intervals, or these slider members 16 may be sewed to a length of tape 25, in which case the slider members 16 are equally spaced and the enlarged head portions 26 thereof are positioned uniformly in alignment. This complete unit may be purchased in given lengths and the tape portion 25 thereof sewed to the top of the curtain or drape. In Figs. 3 and 4 I have shown slider members of the preferred type having tape body portions 21 and enlarged head portions; the head portion 26a in Fig. 4 being shown as of greater length than those in Fig. 3, this being particularly desirable for use in heavy drapes, etc.

In Figs. 5 to 8 I have shown the slider members as being formed of plastic or similar material, the complete slider unit being designated 27 and having a body portion 28 and attaching portion 29 preferably sewed to a tape member 25 of the same type shown in Figs. 3 and 4. The advantage of this type of slider member is best illustrated in Fig. 8 where the tape is shown sewed to the top of the curtain and the slider member 28 shown positioned in a T-slot of a wooden traverse member 30; it will be seen by using slider members of this type that the curtain or the like is positioned away from the traverse member. In Figs. 6 and 7 I have shown a plastic slider member 31 particularly adapted for use with a combined window header and traverse member, such as shown at 14 in Figs. 1 and 2.

In Figs. 9, 13 to 20, and 28 to 33 I have shown different types and shapes of combined moldings and traverse members, and in all cases I prefer to provide an aperture at one or both ends of the slots formed in these combined moldings or traverse members. One form of such aperture is illustrated in Figs. 12 and 13 wherein the combined molding and traverse is indicated as at 32, the bottom of the T-slot as at 33, the narrow slot as at 34 and the aperture as at 35. In this modification the aperture is formed at an angle and is of such size to readily receive the enlarged header portion of the slider member. It will be understood that the slot 34 may be very narrow and, of course, need be only of such width as to accommodate the tape or body portion of the slider member.

Figs. 16, 17 and 18 illustrate a few of many different types of combined window headers and traverses that may be used, Fig. [17] *18* being the solid type such as shown in Fig. 2 and Fig. [18] *17* the standard cut away type with the recessed portions 36. The form of the molding traverse shown in Fig. 19 is similar to that shown in Fig. 16, in that Fig. 16 has grooved portions 37 and the molding in Fig. 19 has the tapered side members 38, the grooves 37 and the tapered side members 38 being so formed as to receive clip members of the type shown in Fig. 21, which comprise an end plate 39 for covering the end of the T-slot, a face portion 40 for covering the apertures 35 and side walls 41 for holding the clip members in place at the end or ends of the moldings; the clip member shown in Fig. 19 is similar to that shown in Fig. [1] *21* except for the side portions which are flat instead of having inturned clamping flanges thereon.

A modified form of aperture for receiving the slider members is illustrated in Figs. 14 and 26, wherein the walls of the aperture are perpendicular to the plane of the molding instead of being angular thereto as in Figs. 12 and 13. In Fig. 14 such aperture is designated 42 and its width is slightly less than the width of the base of the T-slot 33. In this arrangement of aperture and T-slot the end slider member normally moves over the aperture and it is not necessary to have any closure member for the aperture after the insertion of the slider members. In many cases, however, it may be desirable to have closure members for the apertures so as to insure that the slider will not accidentally be dislodged from the T-slot and in Fig. 27 I have shown a spring snap member 43 having channel portions 44 of a width comparable to the width of the aperture 42 and embossed portions 45 adapted to fit in the ledge formed by the difference in width between the T-slot and the aperture. Such a clip member is shown in position in the aperture in Fig. 15 and instead of being sewn directly to the drape as shown in Fig. 27, such clip member may be sewn to the tape strap 25 as shown at 46 in Fig. 3, or may be formed on the end of a slider tape as shown at 47. In any case, it will be obvious that after all the slider members are inserted in position in the aperture at the end of the combined molding and traverse and slid along the T-slot, the clip member 43 can be snapped in place in the aperture and thus will not only fixably position the end of the curtain or drape but will prevent the same from being accidentally removed from the T-slot. In the case of double slot molding such as shown in Fig. 26, I have provided a pivotally mounted latch 48 which may be moved in position over the apertures after the insertion of the slider members. The modified closure members in the form of plastic members may also be used, and in Fig. 22 I have shown a member 49 having projections 50 adapted to be inserted in the aperture members to not only close the apertures but stop further movement of the slider members. In Fig. 23 I have shown a similar member but with the stop members 51 so positioned as to fit into T-slots positioned in different planes. In Fig. 24 I have shown a plastic member having a portion 52 shaped to fit in a T-slot and having a top plate portion 53 for covering the aperture, and in Fig. 25 I have shown a similar modified structure but with the stop members shown in pairs as at 54 to accommodate double slotted moldings as shown in Fig. 26.

Not only can my combined molding and traverse be used to do the double duty of providing a traverse as well as completing the window frame, but the idea of the combined molding and traverse may be readily adapted to forming the header in an open doorway or dining alcoves, closets, storage spaces and the like. In Fig. 9 I have shown the traverse idea as incorporated in the top member of a standard window sash, the sash being shown as at 55 and the T-slot 56; such a T-slot is well adapted for receiving sliders attached to glass curtains. In this same Fig. 9 I have shown a modified form of window header frame as at 57 with the inner portion of this frame recessed as at 58 to readily provide for fastening means.

Other adaptations are illustrated in Figs. 28 to 33, the form shown in Fig. 28 illustrating a triple slot molding member 59 having a bottom T-slot 60 adapted to take slider members supporting either a blackout or a glass curtain and a T-slot 61 adapted to receive slider members supporting draperies or draw curtains. Spaced moldings and traverse members are illustrated in Fig. 29 where at 62 is shown a member similar to that disclosed in Fig. 26 positioned at the side of a header jamb or the like and a simple combined molding and traverse member positioned at the bottom as at 63 and of a shape comparable to that shown in Fig. 17. In Fig. 30 I have shown the header and traverse as being formed as a part of the complete header construction with the bottom of the molding unit 64 flush with the bottom of the header structure in general; the showing here is as of the end of the molding member with the aperture 42 spaced a short distance from the end of the molding member and the slot 33.

In Figs. 31 and 32 I have illustrated a simple form of molding unit 14, as best shown in Fig. 18, and the same is shown as positioned in the side frames 65 of a standard window frame; this arrangement is particularly adaptable for receiving slider members which may be connected to the sides of a [blackout] *light control or "blackout"* curtain 66. In installing such a blackout curtain 66 the header member may be similar to the header shown at 64 in Fig. 30 and the [blackout] curtain may have slider members spaced along the top and along the sides. There also may be slider members attached to the bottom of the [blackout] curtain 66, but instead of a single T-slot and single aperture which would be the case with a top header and two side members, I prefer to have a series of apertures spaced along the bottom member such as shown at 42 in Fig. 14; in this way it will be unnecessary to move the curtain transversely to insert the slider members but each one can be distorted slightly and inserted through its own individual aperture 42 and then moved into place in the T-slot; such an arrangement would give a [blackout] curtain secured on all four sides.

In Fig. 33 I have illustrated a triple slot combined traverse and molding unit 67 which arrangement is particularly adapted for building into a boxed wooden valance.

In Fig. 48 I have shown combined moldings and traverse member 68 having inwardly tapering side walls shown as being recessed into a plastered wall whereby the faces of the traverse members 68 are flush with the faces 69 of the wall; in this manner one traverse may be used for glass curtains and the other traverse used for supporting drapes and the like.

Figure 34:
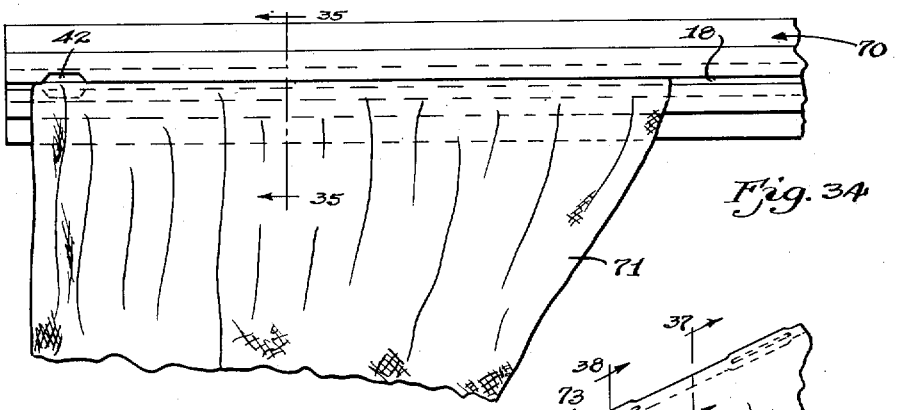
Fig. 34 illustrates a modified form of header for a window frame with the curtain directly movable in the slot formed in the header.

In Fig. 34 I have illustrated a modified form of slidably supporting a curtain and the like [without] *with* the use of *integral* slider members, and in this embodiment the combined traverse and molding member, which may be a window head or window trim or the like, is designated 70 and is provided with a standard aperture 42 and T-slot 18. The curtain 71, which is shown as assembled in the traverse 70 in Fig. 34, may be formed as shown in Fig. 36, by rolling over the top edge 72 and incorporating at spaced intervals 73 a reinforcing *slender head* member, such rolled over portion of the curtain around [the reinforcing] *each head* member having, as best shown in Fig. 38, a cross section as to readily fit into the aperture 42 and to permit the curtain to readily slide along the T-slot 18. A modified form of fabricating the top portion of a curtain or the like is shown in Figs. 39 to 43 in which case the top portion of the curtain 74 is cut on the solid lines 75, which cut out portions are folded back as shown at 76 in Fig. 40 and then secured in rolled up form *as the rod-shaped heads* [as] shown at 77 in Fig. 41. If desired, suitable reinforcing means such as metal, plastic, wood and the like, may be embodied in the rolled up portion as shown at 78 in Fig. 43.

In Figs. 44 to 46 I have illustrated a simple draw string arrangement that may be used in connection with my combined molding and traverse unit. In this modification the combined molding and traverse member is designated 19 and is shown in Figs. 1 and 2 provided with a T-slot 18. Midway of the ends of this traverse member 19 I locate a simple eye screw 79 with the eye thereof in a vertical plane. Another eye screw 80 is positioned at one end of the traverse in a horizontal position and a third eye screw 81 is positioned at the opposite end of the traverse and preferably at an angle of about 45°. The draw string 82 has one cord thereof 83 which passes up through the member 81, moves directly across the traverse through the eyelet 79, through the eyelet 80 and then back through the eyelet 81 to form the cord 84 of the draw string 85. The other cord 86 of the drawing string 82 passes up through the ring 81 half way across the window to the ring 79 and then back through the ring 81 to become the cord 87 of the draw string 85. The cord 83 is connected to the left hand drape 20 at a point 88, and the cord 86 is connected to the right hand drape at the point 89. As shown in Fig. 46, I preferably secure a slider member 16 to the drapes at points adjacent the securing points 88 and 89. In this manner, as will be seen in Fig. 45, as the draw string 85 is pulled down the drapes will be moved outwardly and the slider members 16 will be moved along the T-slot 18 so that the drapes will be moved in even folds; in some cases the heads of the slider members 16 will contact each other in moving the drapes outwardly along the T-slot. It will thus be seen that I have provided a draw cord assembly which matches in simplicity the combined molding and traverse member.

In [standard] *known* curtain rod assemblies or traverse members it is often necessary to provide anti-friction rollers or similar members to insure smooth, quiet movement, and it is frequently impossible to move drapes and curtains back and forth with such an arrangement without a jerky uneven movement. By providing cloth [covered] slider members 16 *having cloth covered heads, in the hanger system herein disclosed,* I have found that these slider members move very smoothly and with just enough friction against the walls of the T-slot to assure uniform quiet movement. The cloth surface provides not only [an anti-friction] *a* surface to permit smooth, easy movement, but at the same time provides just enough friction to eliminate jerky movement and give quiet action *and to resist inadvertent movement of the sliders out of rest positions.*

In Figure 47 I have illustrated the adaptation of the invention to curved header members such as might form the top part of a show case, bath tub, automobile partition or the like, in which the header member is designated 90, the drape or similar curtain as at 20, the slider members as at 16 and the T-slot as at 91. In this modification the traverse member, like the other showings, forms an integral part of the standard header or similar ornamental member and gives this ornamental member a double function; since the slider members are cloth covered and relatively small, the T-slot likewise may be quite small and this combination makes it very easy to move the slider members and hence the drapes and the like, around corners or similar irregularly formed slots.

Fig. 49 shows another adaptation of the invention wherein the top shelf 92 of a kitchen cabinet has grooved a small T-slot 93 for the reception of cabinet curtains 94 supported by slider members in much the same manner as the drape 20 in Fig. 2. The small exposed slot of the T-slot 93 does not detract in any way from the ornamental edge of the shelf 92 and by providing the aperture at the end of the T-slot such as shown in Fig. 14, it will be seen that the cabinet curtains may be easily inserted and removed for washing, and here again the standard shelf member performs a double duty with no additions such as brackets, rods and the like.

In Fig. 50 I have illustrated a method of assembly of a typical drape or curtain to a combined header and traverse member. The curtain 95 is shown as having stitched thereto a tape member 25 of the type illustrated in Fig. 3. Two of the slider members are already inserted in the T-slot 96 and the third slider member 16 is shown ready to be inserted into the aperture 42. As this aperture 42 is preferably of the type shown in Fig. 14, it will be obvious that normally the slider members when once inserted in the T-slot will slide back and forth past the aperture without slipping out through the same. *To this end the slender slider heads, as seen at 26, 26a and 27 in Figs. 3 to 5, are at least long enough to span the*

*length of the aperture 42 where it is wider than the heads.* To remove the curtains, as from the assembly shown in Fig. 50, the end slider member 16 is placed partially over the aperture 42 in the same position as when inserting, and the operator merely has to pull [downwardly] at an angle which tips the slider and starts removal of the curtain; subsequent sliders as they come along will be automatically tilted *on the track base and pulled through the aperture* because of the [down] *angular* pull of the curtain *acting through the connecting body portions of the sliders to tilt their heads and because of the clearance for this tilting which the base section of the track member provides over its slotted base.* This method of insertion and removal is true of substantially all modifications disclosed in the drawings, with the possible exception of an aperture arrangement such as shown in Fig. 12 [and] in which case some kind of a stop must normally be used with the aperture or the end slider member *or members* would be continually pushing through the aperture *when adjusting the hanging.*

*The lateral clearance in the base section 33, which keeps the slender slider heads free to tilt therein, is seen in Fig. 8, for example. It not only permits quick insertion or removal of the heads through the aperture but also permits the heads to tilt on their ends and to move within the base section without noticeable friction or binding upon pulling the attached hanging along the track. Yet the base section, as shown, confines the heads loosely in line therein so that they cannot overlap each other and jam together, and so that they are guided smoothly into the base section as they are inserted through the aperture. It will be noted further in the drawings that the body portions 21, 23, etc., of the sliders have the form and action of bands or straps carrying individually the small slender or rod-shaped heads 26, 26a, 27, etc., in spanning relation to their ends so that the heads tend to positions normal to directions of pull on the body portions. Thus the slider are arranged to tilt as may be needed for free movement of the attached hanging along the track or for quick removal of the heads through an open aperture such as aperture 42.*

The use of cloth [covered] slider members *having slender cloth-covered heads* such as shown in Fig. 11, Fig. 3 and Fig. 50 is very important in my unitary molding and traverse combination in that it not only permits the use of a very small slot, so as not to detract from the ornamental appearance of the molding and not to make it necessary to enlarge the cross sectional shape of the molding, but also, because of the cloth [covering,] *construction and the action of the heads in the base* the slider members work with a smooth, easy and non-jerky motion which is hard to appreciate until one actually has the feel from moving a curtain or drape equipped with my slider [member] *members.* By sewing the slider members or the slider tape to the top of the curtain or drapery, it makes the hanging or removal of curtains as easy for the housewife as plugging in a lamp. The thin cloth slider members make it possible for decorators to hang a single pair of ruffled curtains to a header member such as shown in Figs. 1 and 2, or to assemble a complicated window with glass curtains, drapery and valances all on a triple slot single molding. The slider members being formed of cloth and sewed directly to the curtain or drape may be washed or cleaned right along with the curtain or drape and this makes it unnecessary to detach the large number of hooks or retainer members usually necessary in removing curtains and drapes with the old type curtain rods and fixtures.

The combined header and traverse member as shown in Fig. 50 may also be of the type normally used as the ornamental header in Venetian blinds; in other words, the ornamental header member, in addition to covering up the top part of Venetian blind mechanism can be slotted as shown at 96 and curtains, drapes or blackout curtains hung by means of the slider members 26.

What I claim is:

[1. Hanger construction for curtains and the like, comprising an integral one piece molding unit, one or more longitudinal recesses in said molding, an aperture adjacent one end of said recess or recesses and spaced a predetermined distance from the end of the molding unit, slider members positioned in and movable along said recess or recesses and being movable through said aperture or apertures but normally the end slider members moving past said aperture or apertures.]

[2. In a window assembly and the like of the type having a molding unit and a plurality of slider members, one or more T slots longitudinally formed in said molding unit, the exposed slot or slots in the surface of the molding unit being relatively narrow, a plurality of independent relatively movable slider members spaced a short distance apart and having thin fibrous body portions projecting through said thin slot or each of said slots and sewed directly to the top of the associated curtains, said slider members in each slot having enlarged header portions slidable in said T slot or slots, said slider members, header portions, and curtain sewed to said body portions, being removable as a unit from said molding unit, washed as a unit, and the slider members replaced in said molding unit.]

[3. In a window assembly and the like of the type having a molding unit and a plurality of slider members, a plurality of T slots longitudinally formed in said molding unit, the exposed slots in the surface of the molding unit being relatively narrow, a plurality of independent relatively movable slider members spaced a short distance apart and having thin fibrous body portions projecting through said thin slots and sewed directly to the top of a plurality of curtains and the like, said slider members in each slot having enlarged header portions slidable in said T slots, said slider members, header portions, and curtain sewed to said body portions, being removable as a unit from said molding unit, washed as a unit, and the slider members replaced in said molding unit, said longitudinal T slots extending entirely across the width of the window and past the edge of the window whereby the curtain hung from one slot can slide past the curtain or the like hung from an adjacent slot whereby one or more curtains may be positioned at one side of the window and one or more curtains may be moved along said slots to completely cover the window.]

[4. In a window assembly and the like of the type having a molding unit and a plurality of slider members, a plurality of T slots longitudinally formed in said molding unit, the exposed slots in the surface of the molding unit being relatively narrow, a plurality of slider members having thin fibrous body portions projecting through said thin slots and each sewed directly to a top of one of a plurality of curtains and the like, said slider members in each slot having enlarged header portions slidable in said T slots, said longitudinal T slots extending entirely across the width of the window and past the edge of the window whereby a curtain hung from one slot can slide past a curtain hung from an adjacent slot whereby one or more curtains may be positioned at one side of the window and one or more curtains may be moved along their respective slots to completely cover the window, and apertures severally formed in said T slots and spaced a predetermined distance from the end of the molding whereby any of said curtains may be removed by merely moving the enlarged header portions through the associated aperture but said apertures being spaced from the end of the molding, the end header member or members being freely slidable past the associated aperture in normal use.]

[5. In hanger construction for curtains and the like of the type having an integral wooden molding unit and sliders for the curtains, a longitudinal recess in a side face of said molding unit and a parallel longitudinal recess in a bottom face of said unit, independent slider members having header portions freely positioned in and relatively movable along said recesses, said slider members in one recess being spaced a short distance apart and connected by body portions to one or more curtains and the like such as glass curtains and the slider members in the other recess being connected by body portions to one or more drapes and the like, said slider members, header portions, and curtain sewed to said body portions, being removable as a unit from said molding unit, washed as a unit, and the slider members replaced in said molding unit.]

[6. Hanger construction for curtains and the like comprising an integral wooden molding unit, a longitudinal recess in a side face of said molding unit and a parallel longitudinal recess in a bottom face of said unit, independent slider members having header portions freely positioned in and relatively movable along said recesses, said slider members in one recess being spaced a short distance apart and connected by body portions to one or more curtains and the like such as glass curtains and the slider members in the other recess being connected by body portions to one or more drapes and the like, and apertures formed adjacent the ends of the recesses whereby the slider members may be removed from the respective slots in dismantling the curtains, drapes and the like, said slider members, header portions, and curtain sewed to said body portions, being removable as a unit from said molding unit, washed as a unit, and the slider members replaced in said molding unit.]

[7. In a hanger construction for curtains and the like of the type having a molding unit, one or more longitudinal recesses in said molding, a pull cord arrangement and spaced disconnected slider members positioned in and movable along said recess or recesses, an aperture at one end of said recess or recesses for insertion of said members, said members having body portion for connection to draperies and the like, portions of the said pull cord being connected only to the two slider members closest adjacent to each other at the inner edges of the draperies whereby movement of the pull cord will move the end slider members toward and away from the others to adjust the draperies accordingly, said slider members and connected drapery being removable from and replaceable in the molding as a unit.]

[8. An ornamental hanging such as a curtain or drape for use in slotted tracks, comprising a plurality of individual slider units of fibrous material secured at one end to the top of said hanging at spaced points and enlarged independent header members at the other end of said spaced slider units for engagement with and freely slidable in said slot.]

[9. An ornamental hanging such as a curtain or drape for use in slotted tracks, comprising a strip of fibrous material secured adjacent the top of said hanging and a plurality of individual slider units of fibrous material secured at one end to said strip at spaced points and enlarged independent header members at the other end of said spaced slider units for engagement with and freely slidable in said slot, said hanging and slider members being washable as a unit and the spacing of said slider units determining the folds in the hanging.]

[10. Hanger construction for curtains and the like comprising an integral one-piece molding unit forming a combined ornamental header, shelf and the like and a traverse member, a thin longitudinal recess in said molding, slider members positioned in and movable along said recess, an aperture at one end of said unit for insertion of said members into said recess, said members having disconnected fabric covered header portions freely slidable in and for smooth contact with the walls of said recess and having thin flexible fabric body portions for connection to the curtain and the like.]

[11. In a hanger construction for curtains and the like of the type having a molding unit, and a longitudinal recess in said molding, slider members positioned in and movable along said recess, said members having disconnected fabric covered header portions freely slidable in and for smooth contact with the walls of said recess and having thin flexible fabric body portions for connection to the curtain and the like, said body portions being permanently connected to said header portions whereby said slider members will remain intact even though the fabric contacting the walls of the recess wear through.]

*12. A hanger assembly for curtains, draperies and the like comprising an elongated piece of solid material having a narrow slot extending inwardly from a surface of said piece and extending lengthwise thereof and an enlargement at the inner end of said slot extending lengthwise of said piece forming with said slot a groove substantially T-shaped in cross-section, a plurality of slider members engageable in said enlargement, each slider member being of greater length than its width and thickness, wider than said slot, and of substantially less thickness than the depth of said enlargement, and a flexible cloth tape connected to each slider member and having its width extending lengthwise of said head and being approximately the same width as the length of said slider member and extending outwardly therefrom through said slot for attachment to a curtain, drapery or the like.*

*13. The hanger assembly set forth in the preceding claim in which each slider has a cloth sheath.*

*14. The hanger assembly set forth in claim 12, including an elongated cloth tape securable permanently to an edge of a curtain, drapery and the like, said elongated tape being connected to the ends of said flexible tapes to maintain them in spaced apart relation.*

*15. The hanger assembly set forth in claim 12,*

*in which each slider member is a thin flat strip of rigid material having a cloth sheath.*

*16. The hanger assembly set forth in claim 12, in which the slot is provided with an enlarged area through which said slider members can be inserted into and removed from said enlargement by tilting said members, said enlarged area being wider than said slot and smaller than the area of a slider member to permit the latter to slide along the enlargement behind said enlarged area without becoming detached from said elongated piece.*

*17. A slider and support assembly for hangings, draperies and the like comprising an elongated flexible tape member, a plurality of flexible fabric tape-like elements projecting outwardly from one edge of said member in spaced relation lengthwise of said member, and narrow, elongated rigid heads secured to the outer ends of said elements, said heads being approximately the same length as the width of said elements and wider than the thickness of said elements.*

*18. A slider and support assembly for hangings, draperies and the like comprising an elongated flexible fabric tape member, a plurality of flexible fabric tape-like elements projecting outwardly from one edge of said member in spaced relation lengthwise of said member, and narrow, elongated rigid heads secured to the outer ends of said elements, said heads being approximately the same length as the width of said elements and wider than the thickness of said elements and covered with fabric.*

ANNETTE E. FRIDOLPH.

REFERENCES CITED

The following references are of record in the file of this patent:

UNITED STATES PATENTS

| Number | Name | Date |
|---|---|---|
| 228,990 | Erikson | July 22, 1880 |
| 259,531 | Grimm | June 13, 1882 |
| 336,610 | Weber | Feb. 23, 1886 |
| 473,131 | Smith | Apr. 19, 1892 |
| 537,422 | Kull | Apr. 9, 1895 |
| 568,091 | Lounsbury | Sept. 26, 1896 |
| 641,115 | Isbills | Jan. 9, 1900 |
| 699,971 | Poschmann | May 13, 1902 |
| 841,044 | Perry | Jan. 8, 1907 |
| 1,060,427 | Carlson | Apr. 29, 1913 |
| 1,152,383 | Moore | Aug. 31, 1915 |
| 1,175,136 | Dickey et al. | Mar. 14, 1916 |
| 1,206,421 | Dickey et al. | Nov. 28, 1916 |
| 1,215,126 | Donelly | Feb. 6, 1917 |
| 1,329,889 | Edsall et al. | Feb. 3, 1920 |
| 1,462,803 | Deserty | July 24, 1923 |
| 1,463,598 | Seaman | July 31, 1923 |
| 1,598,479 | Day | Aug. 31, 1926 |
| 1,649,215 | Brown | Nov. 15, 1927 |
| 1,779,730 | Brunson | Oct. 28, 1930 |
| 1,818,786 | Bond | Aug. 11, 1931 |
| 1,845,949 | Whitteman | Feb. 16, 1932 |
| 1,857,768 | Reubel | May 10, 1932 |
| 1,942,712 | Kirsch | Jan. 9, 1934 |
| 2,083,931 | Viola | June 15, 1937 |
| 2,104,261 | Landau | Jan. 4, 1938 |
| 2,147,625 | Brothers | Feb. 21, 1939 |
| 2,207,322 | Long | July 9, 1940 |
| 2,253,427 | Hachtel | Aug. 19, 1941 |
| 2,286,573 | De Witt Ramsey | June 16, 1942 |

FOREIGN PATENTS

| Number | Country | Date |
|---|---|---|
| 63,233 | Norway | Feb. 17, 1941 |
| 90,948 | Germany | Mar. 9, 1897 |
| 122,857 | Germany | Aug. 1, 1901 |